US011743783B2

(12) United States Patent
Schmidt et al.

(10) Patent No.: US 11,743,783 B2
(45) Date of Patent: *Aug. 29, 2023

(54) CONTROLLING NETWORK ACCESS FOR USER EQUIPMENT

(71) Applicant: IPCom Gmbh &Co. KG, Pullach (DE)

(72) Inventors: Andreas Schmidt, Braunschweig (DE); Martin Hans, Bad Saizdetfurth (DE)

(73) Assignee: IPCom GmbH & Co. KG, Pullach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,837

(22) Filed: May 18, 2022

(65) Prior Publication Data

US 2022/0279397 A1 Sep. 1, 2022

Related U.S. Application Data

(63) Continuation of application No. 16/345,564, filed as application No. PCT/EP2018/059310 on Apr. 11, 2018, now Pat. No. 11,363,505.

(30) Foreign Application Priority Data

Apr. 11, 2017 (EP) ..................................... 17166051

(51) Int. Cl.
*H04W 36/00* (2009.01)
*H04W 76/34* (2018.01)
*H04W 76/15* (2018.01)
(52) U.S. Cl.
CPC ... *H04W 36/0069* (2018.08); *H04W 36/0033* (2013.01); *H04W 76/15* (2018.02); *H04W 76/34* (2018.02)

(58) Field of Classification Search
CPC . H04W 36/0069; H04W 76/15; H04W 76/10; H04W 76/34; H04W 36/0033;
(Continued)

(56) References Cited

U.S. PATENT DOCUMENTS 8,588,751 B2* 11/2013 Rinta-Aho ............ H04W 48/10
455/414.3
9,924,430 B2* 3/2018 Liang ................ H04W 36/0072
(Continued)

FOREIGN PATENT DOCUMENTS

EP 2028901 A1 * 2/2009 ........ H04W 36/0011
EP 3104640 A 12/2016
(Continued)

*Primary Examiner* — Un C Cho
*Assistant Examiner* — Lalita W Pace
(74) *Attorney, Agent, or Firm* — PROI Intellectual Property US; Klaus Michael Schmid (57) ABSTRACT

The present disclosure provides a method of managing a connection of a user equipment, UE, device to a core network, the UE device being capable of establishing a connection to the core network using a mobile communication system network and of establishing a connection to the core network via a network other than the mobile communication system network, the method comprising having established a first connection to the core network via the network other than the mobile communication system network, in response to receiving a request from a base station of the mobile communication system to establish a second connection to the base station via the network other than the mobile communication system network, informing the core network of a temporary suspension of the first connection and storing context information of the first connection for a future resumption of the first connection.

10 Claims, 5 Drawing Sheets

(58) Field of Classification Search
CPC ... H04W 36/38; H04W 36/385; H04W 36/24; H04W 36/00; H04W 36/0005; H04W 36/0011; H04W 36/0016; H04W 36/0055; H04W 36/0058; H04W 36/0066; H04W 36/0085; H04W 36/0088; H04W 76/00; H04W 76/16; H04W 76/19; H04W 76/20; H04W 76/30
See application file for complete search history.

(56) References Cited

U.S. PATENT DOCUMENTS

| | | | |
|---|---|---|---|
| 10,045,386 | B2 | 8/2018 | Raghothaman et al. |
| 10,313,941 | B2* | 6/2019 | Manepalli ............. H04W 36/24 |
| 2010/0323700 | A1* | 12/2010 | Bachmann ............ H04W 36/14 |
| | | | 455/436 |
| 2012/0182912 | A1* | 7/2012 | Watfa .................... H04W 92/20 |
| | | | 370/328 |
| 2013/0260810 | A1* | 10/2013 | Rayavarapu .......... H04W 76/19 |
| | | | 455/509 |
| 2013/0343304 | A1* | 12/2013 | Kaippallimalil .... H04W 12/069 |
| | | | 370/329 |
| 2014/0185603 | A1* | 7/2014 | Kaippallimalil .. H04W 36/0027 |
| | | | 370/338 |
| 2015/0109927 | A1* | 4/2015 | Ozturk ............. H04W 36/0066 |
| | | | 370/235 |
| 2015/0334622 | A1* | 11/2015 | Baboescu ............. H04W 36/22 |
| | | | 370/331 |
| 2015/0350952 | A1* | 12/2015 | Ozturk ................ H04W 28/085 |
| | | | 370/329 |
| 2015/0382393 | A1* | 12/2015 | Kiss ..................... H05K 999/99 |
| | | | 370/328 |
| 2018/0070288 | A1* | 3/2018 | Kim .................. H04W 36/0016 |
| 2018/0167983 | A1* | 6/2018 | Salkintzis ............. H04W 76/15 |
| 2019/0037629 | A1* | 1/2019 | Ryu ...................... H04W 76/27 |
| 2019/0208562 | A1* | 7/2019 | Kim ...................... H04W 88/06 |
| 2019/0215691 | A1* | 7/2019 | Salkintzis ........... H04W 12/069 |
| 2020/0015309 | A1* | 1/2020 | Li ............................ H04W 8/02 |

FOREIGN PATENT DOCUMENTS

| | | |
|---|---|---|
| GB | 2541392 A | 2/2017 |
| WO | 2013144613 A | 10/2013 |
| WO | 2016057095 A | 4/2016 |

* cited by examiner

CONTROLLING NETWORK ACCESS FOR USER EQUIPMENT

CROSS-REFERENCE TO RELATED APPLICATION(S)

The present application is a continuation of U.S. patent application Ser. No. 16/345,564 filed Apr. 25, 2019, which is a US National Stage Entry of International Application No. PCT/EP2018/059310 entitled "CONTROLLING NETWORK ACCESS FOR USER EQUIPMENT" and submitted to the World Intellectual Property Organization; the PCT/EP2018/059310 claims priority to European Patent Application No. 17166051.7 entitled "CONTROLLING NETWORK ACCESS FOR USER EQUIPMENT" and submitted to the European Patent Office on Apr. 11, 2017. Accordingly, the entire content of U.S. patent application Ser. No. 16/345,564, the entire content of PCT/EP2018/059310 and the entire content of European Patent Application No. 17166051.7 is incorporated herein by reference.

FIELD OF THE INVENTION

The present invention relates to setting up multiple connections for a mobile device, or user equipment (UE), such as a so-called 3GPP connection and a non-3GPP connection.

BACKGROUND OF THE INVENTION

Figure 1:
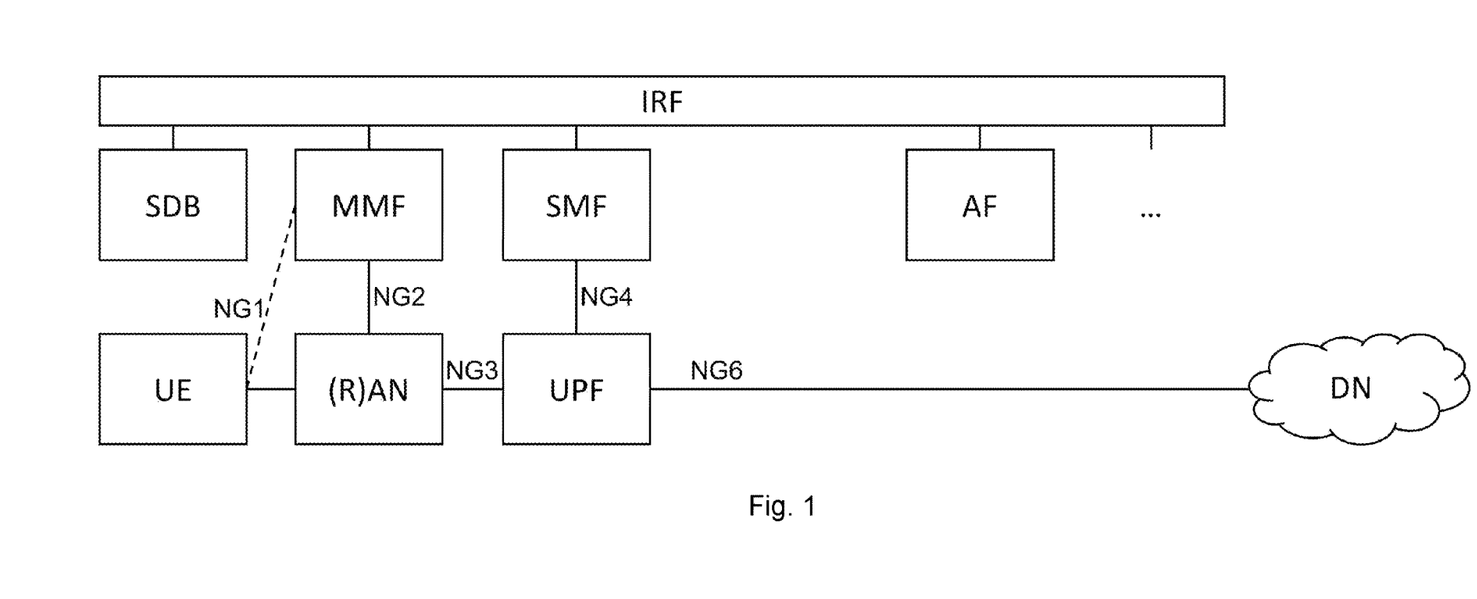
FIG. 1 is a schematic diagram of a network architecture comprising access networks and a core network.

While the 5G core network (CN) architecture is not yet fixed in standardization, various functions and interconnections between functions can be expected to be present in the architecture. FIG. 1 shows a simplified CN architecture with only those network elements and interfaces which are relevant for describing the present invention.

A user equipment, UE, device in general accesses a 3GPP CN through an access network that may be a radio access network (RAN). If the radio access network is defined by 3GPP, for example a 5G radio access network, the access network provides a connection to a access and mobility management function (AMF). The connection is named N2. The AMF may, as all elements depicted in FIG. 1, be present multiple times in a single CN. An AMF is usually selected for a UE at registration of the UE in the network and only one AMF is responsible for a single UE. The AMF, as all elements of the CN, can communicate to other CN element through a routing infrastructure, shown in FIG. 1 as an interconnection and routing function (IRF). The AMF for example connects to a subscriber data base in the universal data management entity (UDM) to authenticate a UE at registration, to receive information about subscribed services and to get security credentials used for communication with the UE.

A UE, when entering a cellular mobile network, connects to the (R)AN and from there to a selected AMF to request registration at the CN. After authentication between the UE and the AMF for which the AMF communicates with the UDM, the UE is registered and it can request services. The logical communication interface between the UE and its selected AMF is named N1, it comprises the interface to the access network and the N2 to the AMF. The N1 interface is shown in FIG. 1 with dashed lines to emphasise its logical nature over multiple different physical interfaces. If data delivery to a data network (DN) should take place, e.g. to the internet, the UE requests setup of an appropriate connection, a so-called PDU session, from the (R)AN through an N3 interface to one or more user plane functions (UPF) and from there via an N6 interface to the data network. The appropriate context activation in the UPFs as well as the allocation of network resources is done by a session management function (SMF) over an N4 interface. The SMF is selected by the AMF according to the subscriber data, the data network to be contacted and current network load. An application function (AF) may provide policies of the network and it may communicate with application servers in the data network to adapt the quality of service provided to the UE.

If the UE needs to setup multiple connections to the same data network, e.g. for different quality of service or over different network addresses, the same or different UPFs may be involved and the same or different SMFs may be responsible. If the UE needs to setup multiple connections to different data networks similarly the same or different UPFs and SMFs may be involved. On the other hand, there is usually only one AMF responsible for the UE.

The 3GPP system defines various radio access mechanisms that tightly integrate wireless local area network (WLAN) radio techniques and 3GPP radio techniques like LTE. This is advantageous to the network operator, as license free access technologies can be combined with operator offered services. Examples of these mechanisms are so called LTE-WLAN Aggregation (LWA) and LTE WLAN Radio Level Integration with IPSec Tunnel (LWIP). GB 2 541 392 A describes an example of LWA. Also, 3GPP TR 21.914 V0.3.0 describes aspects of LWA as well as LWIP.

Both mechanism use LTE and WLAN for data exchange between a base station and a UE in parallel. The LTE radio interface is used for exchange of control and user data whereas the WLAN radio interface is used for user data exchange only. A UE indicates to the eNB its capability to perform LWA, LWIP and details about WLAN-based measurements. The eNB may configure a so-called WLAN mobility set which is a set of WLAN access points with respective parameters (frequency bands, SSID, security parameters) between which the UE may move while keeping the WLAN-connection to the eNB.

For LWA, the WLAN access point may be integrated in the LTE base station (eNodeB, eNB) or it may be connected to the eNB. The eNB may be connected to a group of WLAN access points. Data transfer over bearers may be switched between LTE and WLAN, i.e. only one of the access technologies LTE or WLAN is used for a single bearer at a time, or a bearer may be split, i.e. both access technologies may be used simultaneously.

For LWIP, the basic principles are the same. The main difference to LWA is that legacy WLAN access points can be used for LWIP, i.e. no changes to access points which are currently on the market are needed. The WLAN access points are bound via an IPsec tunnel to the eNB. In this scenario, only bearer switch is used for LWIP (i.e. split bearer is not supported).

In future, other technologies may be specified to tightly couple cellular network radio access technologies deployed on dedicated (operator owned) frequency bands with wireless access technologies using freely available frequency bands like WLAN.

The tight coupling is performed in and controlled by the cellular radio access network, i.e. it is completely hidden from the core network. In that case, for the CN, a UE is connected via a 3GPP radio access network, independent of whether the access network involves WLAN distribution or not.

Cellular mobile networks in general consist of access networks and a core network as already shown in FIG. 1. The access networks provide mainly cellular radio access to mobile device, e.g. via GSM, UMTS or LTE. Additional access networks may provide access via short range radio access, e.g. WLAN, or fixed or satellite access to mobile or fixed devices. The access networks usually provide the complete functionality to setup, control and maintain radio connections to devices.

The core network provides mechanisms that are not access specific, e.g. authentication, authorization and accounting (AAA) of devices and/or subscribers, mobility between access networks and routing between the access networks and external data networks.

In case a UE is accessing a core network via different access networks simultaneously, e.g. via LTE and WLAN, the individual access networks usually are not aware about any other access networks used, i.e. the access networks are deployed independent of each other. In the next generation of mobile networks, the so-called fifth generation (5G) network, a strict separation between access networks and core network is important to allow independent scalability of the networks.

3GPP defines various access networks to access the 3GPP core network, e.g. GSM, UMTS, HSPA, LTE, LTE-A and in near future a 5G access network. These networks are developed to work specifically under control of the 3GPP core network. The respective base stations support the security mechanisms of the core network and they are setup and maintained by the operator of the core network or a trusted third party. As a result, the 3GPP access network can be trusted by the core network.

In addition, the 3GPP core network is setup to support access networks that may not be setup and maintained by any trusted operator, they may also reside outside the operator's domain. These access technologies are collectively named non-3GPP access (N3GPP) and they may be so called untrusted N3GPP access if there is no trust relationship between the core network and the access network.

Figure 2:
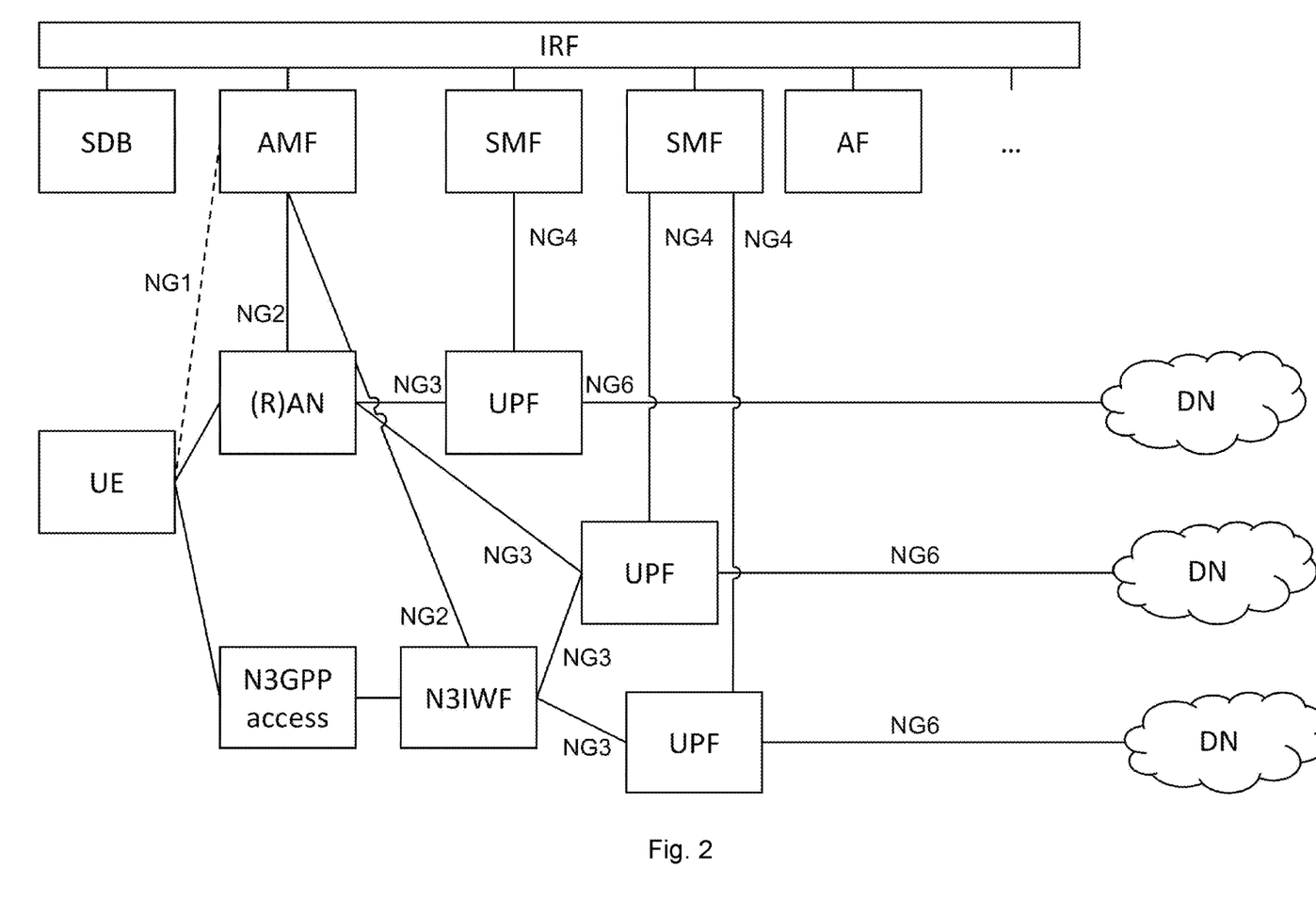
FIG. 2 is a schematic representation of the network of FIG. 1 showing access entities in more detail.

An example network architecture including (R)AN and N3GPP access technologies is depicted in FIG. 2. The figure shows the network elements of FIG. 1 that provide access to a CN via 3GPP access technologies ((R)AN). In addition, FIG. 2 shows the UE of FIG. 1 connected to the CN via a non-3GPP access (N3GPP access, e.g. WLAN). The WLAN is an untrusted node, therefore the WLAN itself connects to a Non-3GPP access interworking function (N3IWF) that may accumulate multiple untrusted Non-3GPP access networks (only one is shown in FIG. 2). The N3IWF is a device that may be maintained by the operator and may therefore be trusted.

The current state of the standardization of the non-3GPP access to a 5G core network describes the following functionality to be performed to access the core network from a UE via untrusted N3GPP access, e.g. WLAN:

The UE acquires IP-connectivity from the WLAN access point and performs a selection of an N3IWF.

After that the UE establishes a security association with the selected N3IWF using pre-shared secrets from the UICC of the UE. The N3IWF selects an appropriate AMF, asks to authenticate the UE or its respective subscriber and receives security credentials. These credentials are the counterpart of those generated by the UICC and build the base for the security association with the UE. The UE and N3IWF setup an IPsec tunnel so that the UE can securely communicate with the N3IWF over the untrusted WLAN.

The N3IWF communicates to the AMF over an N2 interface. This interface is a general access independent interface between access networks and the AMF functions, i.e. it is basically identical to the N2 interface that connects a 5G base station to the AMF function.

Once the IPsec tunnel between UE and N3IWF and the N2 interface are securely setup, the UE has route that constitutes its logical connection to the AMF, so called N1. This route may be an alternative route to the N1 interface established over the (R)AN.

The UE may now request to setup connections to a data network (DN) via UP functions over the untrusted WLAN.

As described above, the 3GPP system offers WLAN access in addition to a 3GPP radio access technology in two completely different ways. The first way is a tightly coupling of WLAN and 3GPP access technologies under control of the 3GPP access network and basically invisible to the core network. The second way is an alternative access to the core network via WLAN over an N3IWF without radio control by 3GPP but with security added between UE and N3IWF and independent of other, e.g. 3GPP, access technologies.

Current and possibly also future mobile devices will provide WLAN access capability via an integrated WLAN module including the IEEE 802.11 standards family MAC and PHY and an appropriate radio frequency layer and one or more antennas for the respective WLAN radio frequency band.

The nature of the WLAN access technology prevents one WLAN module implemented in a UE to be used for connections to more than one access points at a time, at least not without significant restrictions on each of the connections. In other words, a WLAN module integrated in a mobile device provides connections to a single access point but it cannot provide connections to two or more access points.

As a result, a mobile device with an integrated WLAN communication capability and with both techniques, the tightly coupling of WLAN and 3GPP access technologies, and the WLAN access to a 3GPP CN over a N3IWF, implemented, may only be capable of providing one of these features and not both at a time. Accordingly, there are no means to actively control or coordinate the usage of both methods to connect to a 3GPP core network over WLAN-based access technology.

3GPP TS 23.402 describes merely a fixed behaviour of a UE that runs into conflicting configurations for the usage of its WLAN capability to LWA/LWIP and N3GPP access to the CN over WLAN. The solution in that specification, i.e. the solution currently public and deployed, is based on priorities where a selection by the user of the UE takes precedence over network control and, in case no user selection took place, the tight coupling of WLAN to the access network takes precedence over WLAN access to the CN.

Such arrangements do not provide for coordinating and control functions to act and react on different usage scenarios with the WLAN module being a scarce resource shared between access network, core network and probably other networks outside the scope of 3GPP (e.g. private WLAN networks).

US 2009/0080391 A1 describes a core network and radio access network as well as a WLAN network, with a QoS for multiple bearers being negotiated. US 2016/0219470 A1 describes the offloadability of a PDN connection for LTE-WLAN interworking control and management. US 2014/0341138 A1 describes deferred address allocation in case of interworking between non-3GPP access and evolved packet core. US 2007/0249352 A1 describes a system and method for optimizing authentication procedure during inter access system handovers.

Especially, flexible or dynamic methods that allow occupation based decisions to grant a WLAN capability to either tightly coupled (R)AN or N3GPP CN access and to re-assess the decisions based on changes in the occupation or resource allocation are not known.

BRIEF SUMMARY OF THE INVENTION

The present invention provides a method of managing a connection of a user equipment, UE, device to a core network, the UE device being capable of establishing a connection to the core network using a mobile communication system network and of establishing a connection to the core network via a network other than the mobile communication system network, the method comprising having established a first connection to the core network via the network other than the mobile communication system network, in response to receiving a request from a base station of the mobile communication system to establish a second connection to the base station via the network other than the mobile communication system network, informing the core network of a temporary suspension of the first connection and storing context information of the first connection for a future resumption of the first connection.

In a further aspect, the invention provides a method in a core network entity of a mobile communication system network of managing a connection with a user equipment, UE, device, the mobile communication system network comprising a base station for establishing a first connection of the UE device with the core network via the mobile communication system network, and an interworking function for establishing a second connection of the UE device with the core network via a network other than the mobile communication system network, the method comprising establishing the second connection with the UE device via the interworking function; and in response to a message received from the UE device, suspending the second connection via the interworking function while storing context information for the second connection pending a resumption of the second connection while communicating with the UE device via the first connection.

A pre-assumption for all aspects of this invention is a UE that is capable of accessing a core network of a mobile communication system via one or more access networks of the mobile communication system, e.g. via a RAN. In addition, the UE is capable of accessing the core network via one or more networks that are not fully under control of the mobile communication system (N3GPP), e.g. a WLAN. The terms RAN and N3GPP are used in the following to distinguish mobile network controlled access technologies from those not mobile network controlled. The N3GPP may be a WLAN, but this invention is not limited to any particular access technology, i.e. also other technologies can be used that constitute a limited resource and that are used either in the RAN or to directly access the CN but not both.

At some point at the network registration or at a radio resource connection setup or within a similar procedure the UE sends its radio capabilities to the RAN, the capabilities comprising information about the UE capability to perform tightly coupled RAN and WLAN integration. The UE may also have information stored that supports the UE in accessing the CN via WLAN, the support information may have been received from the CN during or after a previous registration procedure as a result to a request for such information by the UE or as a result of providing WLAN access capability information to the CN. Alternatively, the support information may be stored on a UICC, received imprinted with the UICC or received via network-to-UICC transmission from the mobile network.

In a first aspect of the invention, a UE has a N3GPP connection via WLAN to a core network and in response to the UE receiving a request from a base station of a RAN to setup a WLAN connection to the base station, the UE provides information to the core network about a temporary suspension of the N3GPP connection via WLAN and the UE stores context information regarding the N3GPP connection.

In other words, while an N3GPP connection is setup between UE and core network, the base station requests the UE to setup a WLAN connection to the base station. Instead of releasing the context between UE and the core network or refusing the WLAN connection to the base station, the UE informs the core network about suspension of the connection and both sides keep the respective context. This enables the UE and the core network to resume the connection quickly when the WLAN module is freed by the RAN without wasting time to re-establish the connection etc.

The request from the base station may be a configuration message from the base station comprising connection setup with the base station at least partly via WLAN, e.g. according to the LWA or LWIP feature. The providing information to the core network may be done over the N3GPP connection via WLAN. The providing information to the core network may be done over the RAN. The UE may be configured by the core network during N3GPP connection setup to inform the core network in the described way.

The UE sets up and maintains an IPsec connection to an entity of the core network (N3IWF) over the N3GPP connection via WLAN, the maintaining comprises sending keep-alive messages to the entity to determine liveliness of the connection when no user data is exchanged between the UE and the entity; and the UE while suspending the N3GPP connection via WLAN suspending transmission of keep-alive messages while maintaining and storing the IPsec context.

In other words, the context that is stored and re-stored on resumption of the connection is an IPsec security association to save the time of setup of the security association after resumption.

In a second aspect of the invention, in response to releasing the WLAN connection to the base station, the UE resumes the N3GPP connection via WLAN to the core network using the WLAN that was used before the N3GPP connection was suspended.

In other words, after the WLAN of the UE is not used by the RAN, the N3GPP connection is restored from where it was suspended.

In one embodiment, the UE receives threshold values from the base station and releases the WLAN connection autonomously based on measurements of a WLAN signal exceeding or falling under the threshold. In other words, the UE compares WLAN signal strength with received thresholds and autonomously drops based on the comparison the WLAN connection to the base station. The WLAN signals can comprise the WLAN of the base station as well as one or more WLANs suitable to resume the N3GPP connection, so that the UE is enabled to compare the quality and the expected benefit of the two usage scenarios of its WLAN capability. The UE provides measurements to the base station, the measurements comprise measurements of signals of a WLAN that is suitable to resume the N3GPP connection via WLAN and in response the UE receives from the base station a request to release the WLAN connection to the base station. In other words, the base station requests the UE to drop the RAN-based WLAN connection dependent at least in parts on the reception quality of the N3GPP WLAN. This allows the RAN to compare the benefit of using tightly coupled WLAN with the expected benefit of offloading traffic via a N3GPP connection. This method may also be applied if the N3GPP WLAN is a home WLAN. In other words, the RAN may be informed via measurement reports about reception quality of the home WLAN and based on that the RAN may release a WLAN interworking connection to free the WLAN hardware of the UE for usage in the user's home WLAN. The principle is of course applicable as well to any known public or private WLAN hot spots.

In a further aspect of the invention, in response to releasing the WLAN connection to the base station, the UE determines a WLAN suitable to resume the N3GPP connection to the CN, connects to that WLAN suitable and resumes the N3GPP connection to the core network.

In other words, after the WLAN of the UE is not used by the RAN, the N3GPP connection is restored using a different WLAN which is selected after determination of the suitability of the WLAN to resume the N3GPP.

In a still further aspect of the invention, in response to releasing the WLAN connection to the base station, the UE determines that no WLAN is suitable to resume the N3GPP connection to the core network and the UE provides information to the core network about the N3GPP connection to be released (or not resumable) and the UE releases the N3GPP connection.

In other words, if after release of the WLAN capability by the RAN no suitable WLAN for resumption of the N3GPP connection is available, the network is informed, so it can delete respective stored contexts, and the UE deletes the stored context. Releasing the N3GPP connection comprises deleting the context information stored in the UE.

In a further aspect of the invention, the UE receiving from the core network (e.g. as part of the setup of the N3GPP connection via WLAN) a timer value and in response to suspending the N3GPP connection via WLAN starting a timer and releasing the N3GPP connection (and deleting the stored context information) when the timer expires according to the received timer value.

In other words, the context stored in the UE and the network to resume the N3GPP connection is only valid for a specified time, the time specified and configured by the core network.

In one aspect of the invention a core network maintaining a connection to a UE at least in parts over a WLAN and in response to receiving from the UE an information about suspension of the connection, suspending the connection while storing context information regarding the connection and resuming the connection using the context information triggered by the UE.

Here, the core network sets up and maintains an IPsec connection to the UE over the N3GPP connection over a WLAN, the maintaining comprises sending keep-alive messages to the UE to determine liveliness of the connection when no user data is exchanged between the UE and the core network; and the core network while suspending the N3GPP connection via WLAN suspending transmission of keep-alive messages while maintaining and storing the IPsec context.

The core network deletes the context and releases the connection to the UE in response to receiving information from the UE that the connection will not be resumed. The core network transmits a timer value to the UE and releasing the connection and deleting the context based on the timer value.

A UE having at least two connections to a core network, at least one connection being a N3GPP connection via WLAN and at least another connection being a RAN connection; the UE having a first logical connection over the N3GPP connection via WLAN through the core network to a data network, the UE determining a data traffic load on the first logical connection and in response to receiving from a base station of a RAN a request to setup a WLAN connection to the base station, determining whether to accept or refuse the request from the base station of the RAN based on the determined data traffic load.

In other words, if a PDU session exists between the UE and a data network that is routed over a N3GPP connection via WLAN and the RAN requests to connect the WLAN to the base station, the UE may take the traffic over the PDU session into account to decide whether to follow the request. If significant data traffic is currently exchanged between UE and the data network, the request may be refused in order not to disturb the data transmission.

In another aspect of the invention the UE may in a similar scenario as described above determine whether to accept or refuse the request from the base station of the RAN based on whether for all first logical connections to a data network over a N3GPP connection via WLAN a second logical connection to the data network over a RAN is established.

In other words, a UE only accepts to drop or suspend N3GPP connections via WLAN if a connection to the respective data network also exists over RAN. This is the case if the N3GPP connection was used to offload data from the RAN but still a RAN based connection exists, probably due to quality and/or reliability of service demands. If that is the case, the WLAN capability of the UE may be used to enhance the RAN connection and use it to continue data exchange with the data network.

The two aspects above may be enhanced in that the UE adapts the UE capability information with respect to the tight coupling techniques of WLAN and RAN that is sent to the base station by the UE. The UE may transmit the capability of tight coupling only, if data traffic load on N3GPP connections via WLAN is low or if alternative routes via RAN exist for all connections to data networks. Otherwise the RAN will be informed that the UE is not capable of WLAN interworking features.

A UE having at least two connections to a core network, at least one connection being a N3GPP connection via WLAN and at least another connection being a RAN connection; the UE having a first logical connection over the N3GPP connection via WLAN through the core network to a data network, the UE in response to receiving from a base station of a RAN a request to setup a WLAN connection to the base station, requesting the core network to setup a second logical connection over the RAN through the core network to the data network.

In other words, if a PDU session exists between the UE and a data network that is routed over a N3GPP connection via WLAN and the RAN requests to connect the WLAN to the base station, the UE may request the core network to setup an alternative route via RAN to the data network. This is beneficial in that data transfer between UE and core network can continue over RAN.

BRIEF DESCRIPTION OF THE DRAWINGS

Preferred embodiments of the invention will now be described, by way of example only, with reference to the accompanying drawings in which.

DETAILED DESCRIPTION OF THE DRAWINGS

In the following, message sequence charts are described illustrating the invention. The message sequences are example wise shown between entities of a network that may be similar or identical to the network depicted in FIG. 1.

Figure 3:
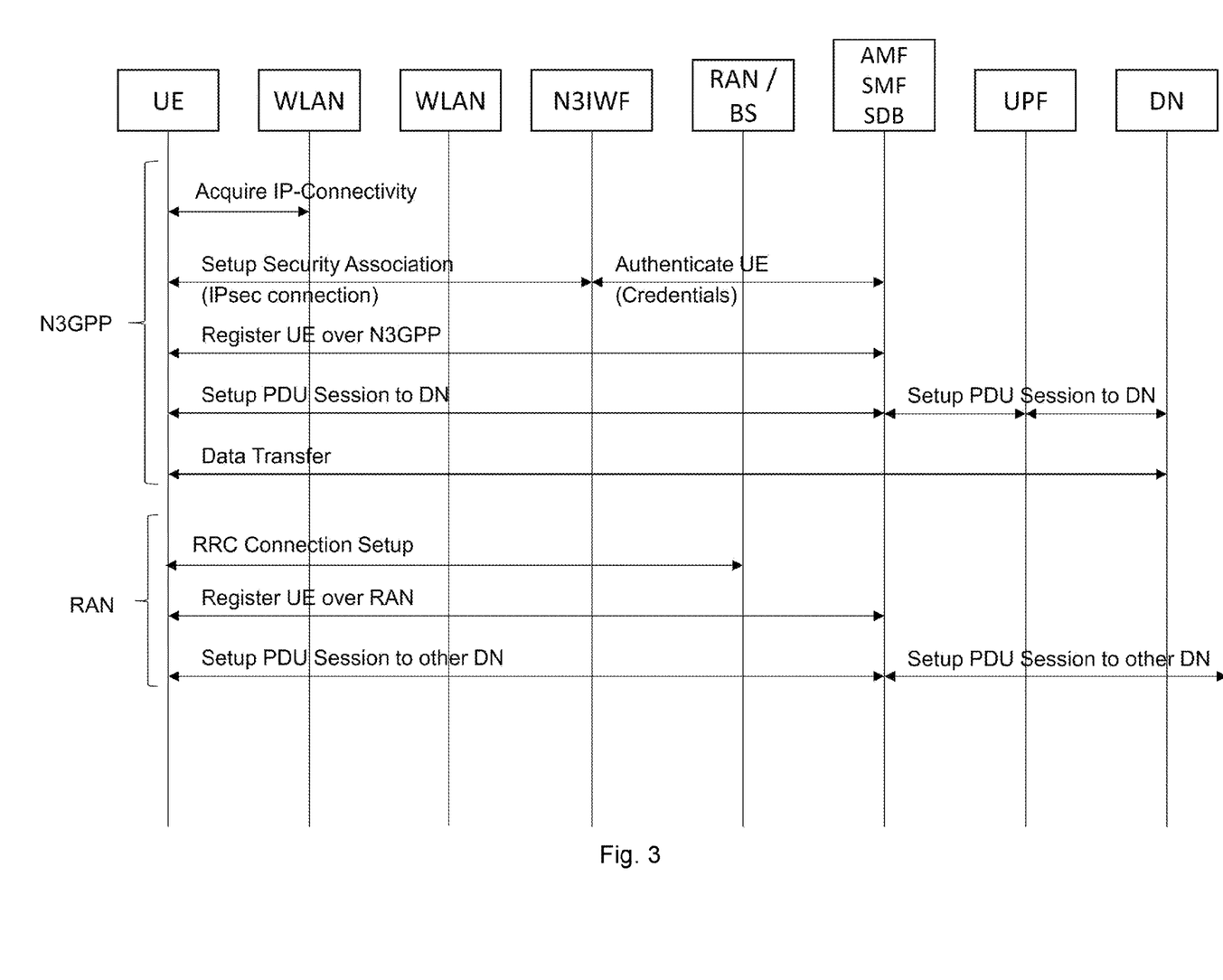
FIG. 3 is a first message sequence chart.
Figure 4:
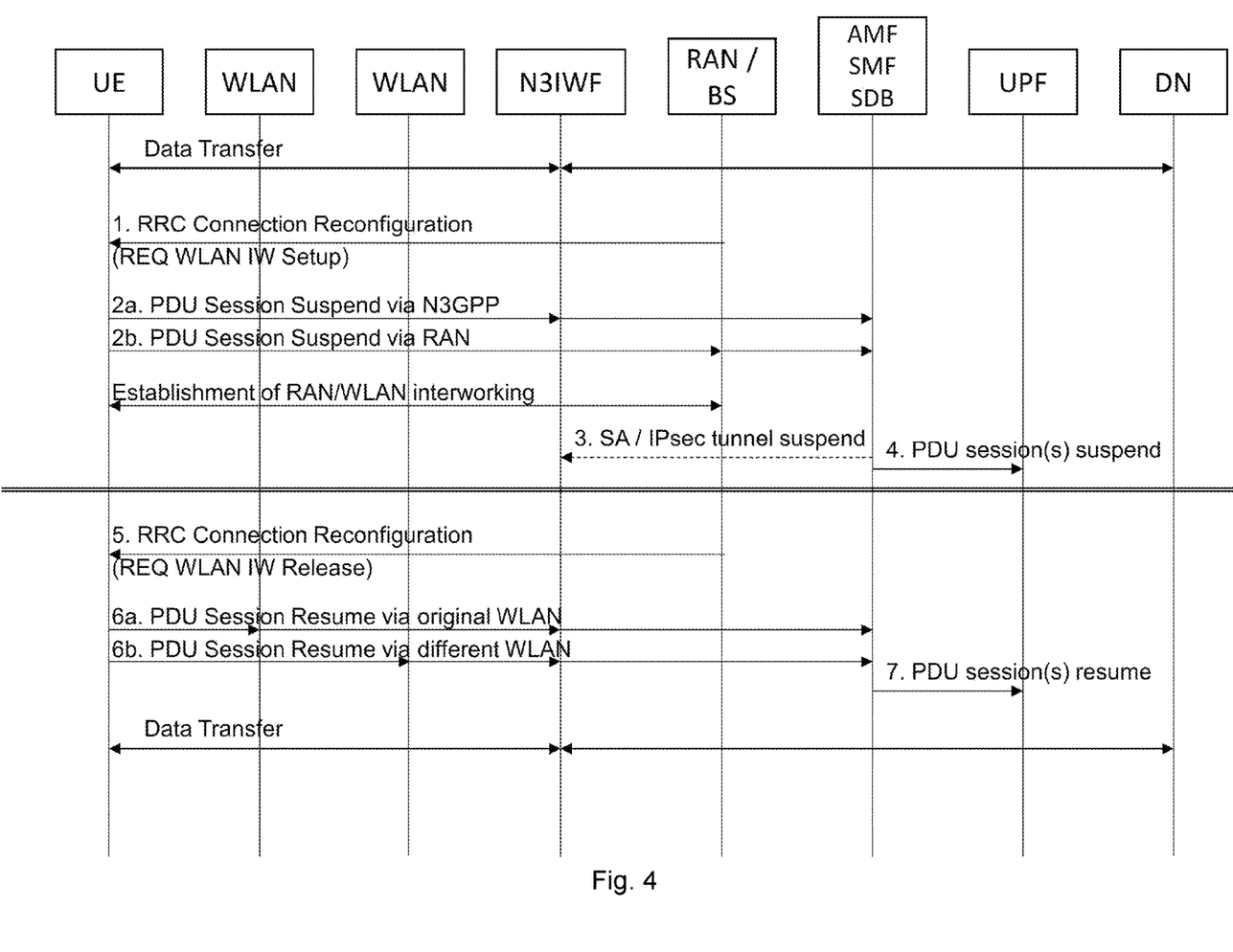
FIG. 4 is a second message sequence chart.
Figure 5:
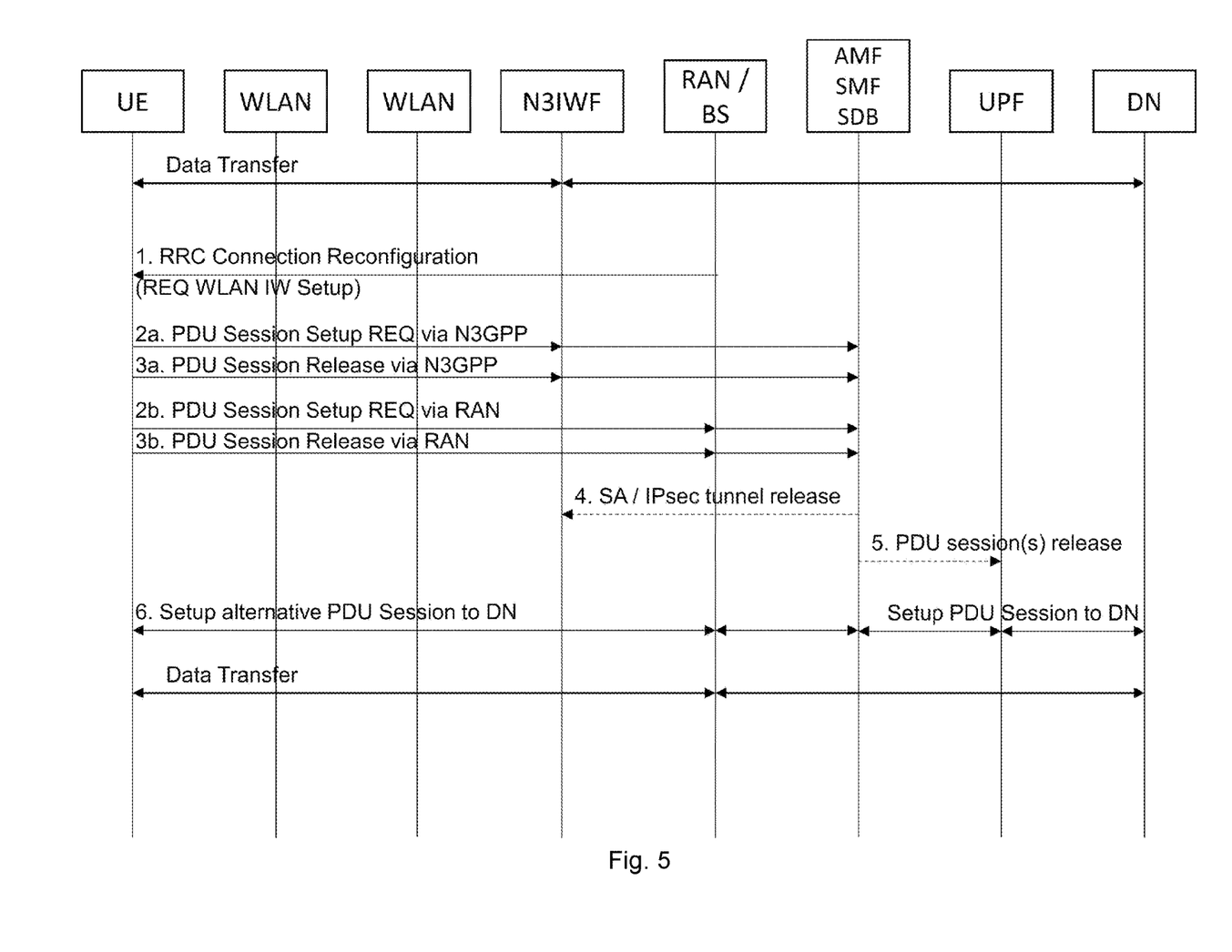
FIG. 5 is a third message sequence chart.

FIGS. 3 to 5 show the following network entities and respective message explained in more detail below.

A UE that may be a mobile device equipped with means for communicating in a cellular mobile network of one or more of the known or developed radio access techniques GSM, UMTS, HSPA, LTE or 5G. The UE is also equipped with wireless short range communication techniques like wireless local area network (WLAN or WiFi), implemented with any combination of the IEEE 802.11 standards series, Bluetooth, ZigBee etc.

Multiple WLAN access points, shown as two boxes named WLAN in the figures. The access points may offer a public WLAN connection, a home WLAN connection or they may be owned and deployed by a network operator, e.g. the operator of a cellular mobile network. The WLAN access points offer wireless access to one or more networks that provide at least a connection to an aggregating node of the core network.

The aggregating node is named N3IWF for next generation packet data gateway in the figures. The node is able to communicate with the two WLAN access points via any network connection, e.g. DSL and IP-networks. The N3IWF is able to establish a security association with the UE over the WLAN access points. Also, the N3IWF is a node that may be trusted by an operator's core network and that can communicate with one or more control plane functions (AMF SMF UDM) and one or more user plane functions (UPF) in the core network. The control and user plane functions reside in network nodes of the core network.

The figures also show a radio access network (RAN) of the cellular mobile network. The RAN comprises one or more base stations (BS) that are shown collectively in one block named RAN/BS. The RAN can communicate with the control and user plane nodes of the core network as well. One of the services a core network offers to its users is provision of a data service between the UE via an access network (RAN or WLAN and N3IWF) and one or more UPFs to a data network (DN) shown as the right-most block in the figures.

A pre-requisite for all embodiments that follow is shown in FIG. 3. A UE sets up two connections to a core network, one connection over N3GPP (WLAN) and another over cellular radio access (RAN). The two connection setup processes may be performed by the UE and the network in arbitrary order and at arbitrary times or simultaneously. FIG. 3 shows example wise the N3GPP connection setup first and the RAN connection setup second.

The UE selects a WLAN offered by one or more access points and acquires IP-connectivity. The respective IP-address is allocated by the WLAN access point, an N3IWF or any other network node typically offering a DHCP service for that purpose. The IP address is communicated to the UE and the UE is able to contact the N3IWF to establish a security association and thus setup an IPsec tunnel between UE and N3IWF. To setup the security association, the N3IWF needs to authenticate the UE. Therefore, it requests the core network, especially the AMF, to request UE authentication and authorization and receive credentials for the security association establishment.

When a secure connection between UE and N3IWF is setup, the UE may send messages to the core network (so called NAS messages) according to the UE-AMF communication protocol. The UE may register itself at the network over the N3GPP connection.

After successful registration the UE may request services, e.g. the setup of a PDU session to a specific data network (DN). The control plane functions in the core network configure a user plane function to route packets from the UE to the DN, the N3IWF may be provided with appropriate filters or rules for routing packets and data transfer may happen between UE and the DN.

To setup a RAN connection to the core network the UE request the setup of a connection to the RAN (so called RRC Connection). During RRC Connection setup the UE may inform the RAN about its capabilities including its capabilities to perform LWA, LWIP or any other technique that couple WLAN and cellular radio access on RAN level. With an established RRC Connection, the UE can register the RAN connection at the core network and request services as explained above. For example, a data transfer service to another data network that is not shown in FIG. 3 is requested and granted.

Now looking at FIG. 4, data transfer may be ongoing between the UE and the data network. The procedure starts at step 1: the RAN configures the UE to use one of the WLAN interworking techniques that the UE indicated to support. The configuration may comprise a start time when to apply the new configuration or the configuration may be for immediate start.

According to this embodiment, the UE informs the core network about the necessity to suspend the N3GPP connection. The UE may send a message informing the AMF about the N3GPP connection suspension which is applicable for all logical connections that the UE has over the WLAN access or the UE indicates all PDU sessions that are impacted by the suspending plus the N1 interface to the AMF over N3GPP.

The message or messages containing the suspension information may be sent by the UE over the N3GPP access, as indicated in step 2a, to the AMF before the new RAN configuration is applied. This message will then pass the N3IWF and this entity may react on the message immediately. Alternatively, the AMF informs the N3IWF in a step 3 about suspending the connection to the UE.

The message(s) to the AMF may alternatively be sent by the UE over the RAN as indicated in step 2b. Especially if the configuration from the base station is to be applied quickly so that no time is left to transmit a message over WLAN, this alternative will apply. It may be foreseen in the UE to decide which way to send the message to the AMF dependent on the time left before the WLAN communication with the base station needs to be established. As a result, step 3 is required in this case to inform the N3IWF about the suspension.

As a result of the suspending, the N3IWF keeps the security association and also suspends sending keep-alive messages to the UE. In other words, the N3IWF accepts the UE to be unreachable without deleting the security association. The N3IWF may start a timer after which all context regarding the UE including the security associations are deleted.

The AMF as well keeps all context information of the UE regarding the N3GPP connection so that after reestablishment of the WLAN connection to the N3IWF the UE may communicate to the AMF. The AMF also informs in step 4 (that may occur before or after step 3) the user plane functions involved to suspend the respective PDU sessions, i.e. to not forward data received from the data network to the UE, but store the data and inform the AMF about downlink data pending.

The UE will at some point establish the RAN/WLAN interworking as requested by the base station. This step is not numbered as it is well known and may occur any time after the configuration is received by the UE from the base station.

After some time, indicated by a horizontal double line in FIG. 4, the RAN may release the WLAN interworking. Various reasons may lead to the release of the RAN-WLAN coupling. It may be that the amount of data to be transferred over RAN is reduced, the WLAN connection to the base station does not suffice its quality criteria, or the connection to the RAN must change, e.g. due to handover, and after the change no WLAN interworking is available. The base station example wises may send a reconfiguration to the UE indicating the release of the WLAN connection in step 5 of FIG. 4.

Now, due to the context stored in the UE and the N3IWF, the connection N3GPP connection can be resumed from where it was suspended. If the same WLAN is available and has sufficient signal strength the UE may directly use the same WLAN to contact the N3IWF and AMF and resume the connection in step 6*a*. Alternatively, the UE selects another WLAN. It may need to acquire IP-connectivity first before it can contact the N3IWF and AMF to resume the connection in step 6*b*. The user plane functions are informed about the resumption of respective PDU sessions in step 7 and data transfer can happen.

An alternative approach is depicted example wise in FIG. 5 which again assumes the procedures of FIG. 3 to have happened and data transfer to take place between UE and at least one DN over a N3GPP connection over WLAN.

In step 1 again the RAN configures the UE to use one of the WLAN interworking techniques that the UE indicated to support.

In reply to the reception of the reconfiguration, the UE requests to setup an additional PDU session to the DN over RAN in order not to lose the data transfer capability with the DN. The request may be sent over the N3GPP connection in step 2*a*. or via RAN in step 2*b*. Following that, the UE may request the release of the impacted PDU sessions over N3GPP in step 3*a*. or via RAN in step 3*b*.

Alternatively to steps 2*a*. and 3*a*. or 2*b*. and 3*b*., respectively, the UE may request to change the access technique (or in other words change the N3 connection) for the impacted PDU sessions from N3GPP to RAN. This alternative is not shown in FIG. 5. It would result in a combined step 2 and 3 to a new step 2' called PDU session modification request sent via N3GPP or RAN.

The network may, as a result inform the N3IWF to release the security association and/or IPsec tunnels to the UE in step 4. The network may as well rely on a timer based or keep-alive message based dead peer detection in the N3IWF and refrain from step 4.

The network may also in steps 5 release the PDU sessions that are impacted by the release of the N3GPP connection.

In step 6. the requested alternative PDU session is setup over RAN between the UE and the data network. This step may include step 5. (simultaneous release and setup) or step 6. may comprise a PDU session modification in which the existing PDU sessions to the data network are modified to reflect the route from UPF to the UE via RAN instead of the N3IWF.

Data transfer can continue between UE and the DN after successful PDU session setup or modification. Whether the data transfer over RAN uses the WLAN or cellular technology within the RAN is a RAN decision. The tight coupling of both technologies allows both and the decision is not an aspect of this invention.

An alternative approach not shown in any figure is a combination of the procedures shown in FIG. 4 and FIG. 5. UE may decide to request the setup of a new PDU session to a DN via RAN as shown in step 2*a*/*b* in FIG. 5 but still request to resume and not release the PDU sessions that go over N3GPP via WLAN. This would allow the UE to quickly fall back to WLAN offloading via N3GPP once the RAN releases the WLAN connection and may not have sufficient resources to cover the newly established PDU session with the DN.

Whether the UE requests a setup of a new PDU session as a result of the RAN requesting WLAN interworking may be decided in the UE based on traffic load on the respective PDU session.

The whole idea of suspending PDU sessions and/or relaxing the N3IWF timers to allow the UE to not be reachable for a limited time may also be deployed for the sole purpose of preparing for a failure of the RAN-based WLAN interworking. That is, the UE may receive a configuration from the RAN to start WLAN interworking techniques and inform the N3IWF and/or the AMF to "wait" before releasing the N3GPP connection via WLAN just to enable the UE to use the connection if the WLAN interworking does not work. This may be the case if the base station bases its decision on old or insufficient measurements provided by the UE. The procedures would very much look the same as described with respect to FIGS. 3 and 4. Only timers would be set short and the UPF may not be informed about a suspension of PDU sessions. Instead only the N3IWF would allow a little time of absence of the UE after which the UE can come back and re-use the security association and the registration with the AMF over N3GPP.

The invention claimed is:

1. A method of managing a connection of a user equipment, UE, device to a core network, the UE device being capable of establishing a connection to the core network using a 3gpp mobile communication system network and of establishing a connection to the core network via a non-3GPP network using a license free access technology, the method comprising:

having established a first connection to the core network via the non-3GPP network and having established a second connection to the core network via the 3GPP mobile communication system network, in response to receiving a request from a base station of the mobile communication system to configure the second connection to the base station to use the license free access technology, informing the core network of a temporary suspension of the first connection and storing context information of the first connection for a future resumption of the first connection.

2. The method of claim 1, wherein while storing context information of the first connection for a future resumption of the first connection, the UE device communicates with the core network via the base station.

3. The method of claim 1, wherein the request from the base station is a configuration message.

4. The method according to claim 1, wherein the informing is performed over the first connection.

5. The method according to claim 1, wherein the informing is performed over a mobile communication connection.

6. The method according to claim 1, wherein the UE device stores IPsec context information as the context information.

7. The method according to claim 1, wherein the license free access technology used for the second connection may be released autonomously by the UE device based on signal level measurements or in response to a request from the base station.

8. The method according to claim 1, wherein if after release of the license free access technology used for the second connection the first connection cannot be re-established, the UE device provides information to the core network to release the first connection via the mobile communication system.

9. The method according to claim 1, wherein the context information is stored for a predetermined time and deleted if the temporary suspension extends beyond the predetermined time.

10. The method according to claim 1, wherein the UE device periodically sends keep-alive messages for maintaining the first connection while having the first connection with the mobile communication system network via the interworking function; and ceases to send the keep-alive messages while suspending the first connection with the mobile communication system network via the interworking function.

* * * * *